United States Patent [19]

Anderson

[11] 4,071,696
[45] Jan. 31, 1978

[54] TELEPHONE WALL JACK COVER

[75] Inventor: Bruce W. Anderson, Rosemont, Ill.

[73] Assignee: Illinois Tool Works Inc., Chicago, Ill.

[21] Appl. No.: 681,500

[22] Filed: Apr. 29, 1976

[51] Int. Cl.² .............................................. H04M 1/00
[52] U.S. Cl. ................................ 179/1 PC; 179/91 R;
339/91 R
[58] Field of Search ................ 179/1 PC, 91 A, 91 R;
339/192 R, 192 RC, 203, 176 M, 91 R

[56] References Cited

U.S. PATENT DOCUMENTS

| 3,369,214 | 2/1968 | Krumreich et al. | 339/91 |
| 3,513,261 | 5/1970 | Dal Monte et al. | 179/1 PC |
| 3,668,324 | 6/1972 | Firestone | 179/1 PC |
| 3,982,809 | 9/1976 | Ward et al. | 339/91 |

Primary Examiner—Kathleen H. Claffy
Assistant Examiner—Gerald L. Brigance
Attorney, Agent, or Firm—Olson, Trexler, Wolters, Bushnell & Fosse, Ltd.

[57] ABSTRACT

An electrical jack for telephones or the like is disclosed. The jack includes a box-like cover in which a number of bi-ended wires are mounted. Each wire terminates at one end in a spring contact adapted and located for engagement with a screw connector carried on a terminal block. At its other end, each wire terminates in a resilient folded spring contact. A clip member receives and mounts these folded spring contacts in a fixed, electrically spaced apart relationship. The clip is carried in the cover in such a location as to form part of a socket adapted to receive a multi-wire electrical plug.

19 Claims, 6 Drawing Figures

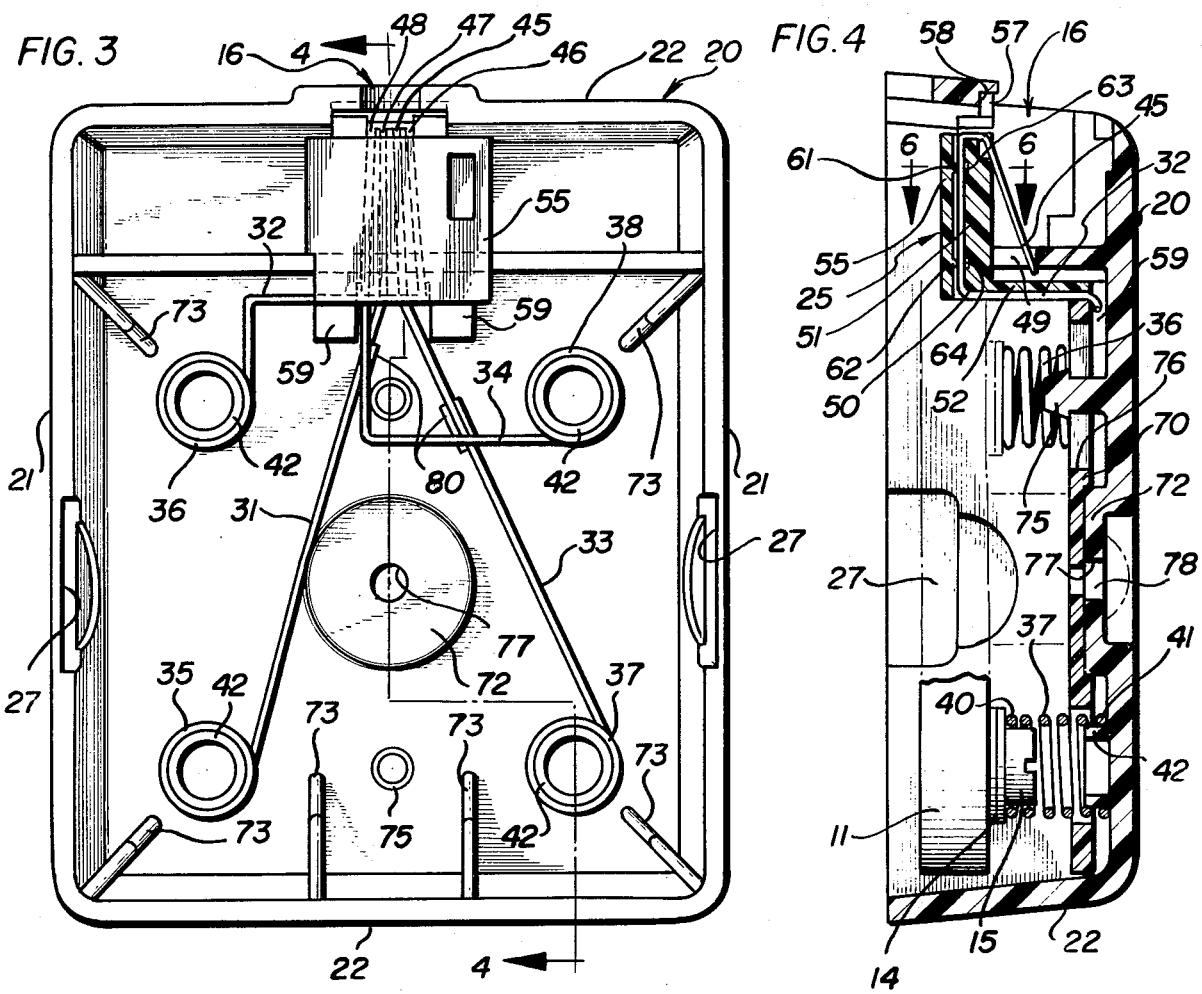
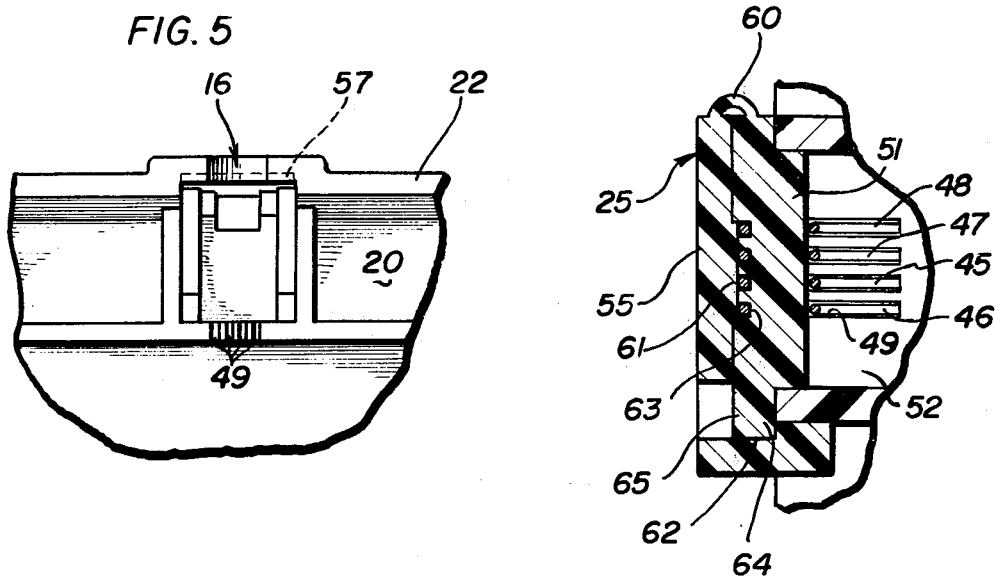

TELEPHONE WALL JACK COVER

BACKGROUND OF THE INVENTION

This invention relates generally to connectors and more particularly concerns a novel and inexpensive jack connector especially adapted for use with telephone and like devices.

Modern telephone systems usually provide multiple wire distribution cables leading from a permanent master connector box or switchboard to a suitable terminal block location within an office or home. In the past, a multi-wire instrument cable was lead from the terminal block to a telephone instrument. These terminal blocks were more or less permanently installed upon a room wall, a baseboard or some other convenient mount and then covered by a simple cover. However, in modern modular telephone systems, the instrument cable terminates in an integral plug adapted to be quickly and easily plugged into a jack.

Installing conversion telephone jacks over a terminal block can be expensive, for the telephone company must send a telephone installer to the site when a modular or plug-in telephone system is used for the first time. The telephone installer must connect the multiple leads off the modular telephone jack to the terminal block, and then mount the jack over the block on a wall or similar location. The installer then plugs in the instrument cable, and tests the system. If these lead connections to the terminal block are improperly made, or if extended use or an accident damages the jack, additional expense is incurred in repairing or replacing the multiple lead jack itself.

It is the general object of the present invention to provide a modular or plug-in type jack conversion unit for telephones or the like which can be easily and quickly installed over a terminal block, yet which provide long, trouble-free service even in rugged installation conditions.

A more specific object is to provide such a telephone jack unit which makes telephone installation relatively easy and inexpensive. A related object is to provide such a jack which can be used to install a telephone without requiring the telephone installer to individually connect each wire lead of the jack structure to the distribution cable terminal block.

Another object is to provide a modular telephone jack with orientating means and which requires but a single fastener attachment, such as a screw fastener to mount the jack in oriented relation to the associated cable terminal blocks, thereby permitting rapid oriented mounting at a low labor cost. Yet another object is to provide such a telephone jack which is made up or assembled from relatively inexpensive parts. A related object is to provide such a jack in which jack unit parts can be inexpensively formed of thermoplastic resin material and a number of small stainless steel or other corrosion resistant inexpensive wires, as distinguished from devices which require the use of elaborate metal or plastic devices and/or gold plated or other expensive wiring which is subject to wear and exposure of corrodible base material of the wires.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 3 is a top plan view of the telephone jack showing yet further detail the jack interior, but with the retaining plate removed for clarity;

FIG. 4 is a sectional view taken substantially in the plane of line 4—4 in FIG. 3;

FIG. 5 is a fragmentary view showing a socket portion of the jack cover; and

FIG. 6 is a fragmentary sectional view taken substantially in the plane of line 6—6 in FIG. 4.

DETAILED DESCRIPTION

While the invention will be described in connection with a preferred embodiment, it will be understood that it is not intended to limit the invention to this embodiment. For example the principles of this invention could be used with a variety of electrical interconnector devices other than telephone jacks. On the contrary, it is intended to cover all alternatives, modifications and equivalents as may be included within the spirit and scope of the invention as defined by the appended claims.

Figure 1:
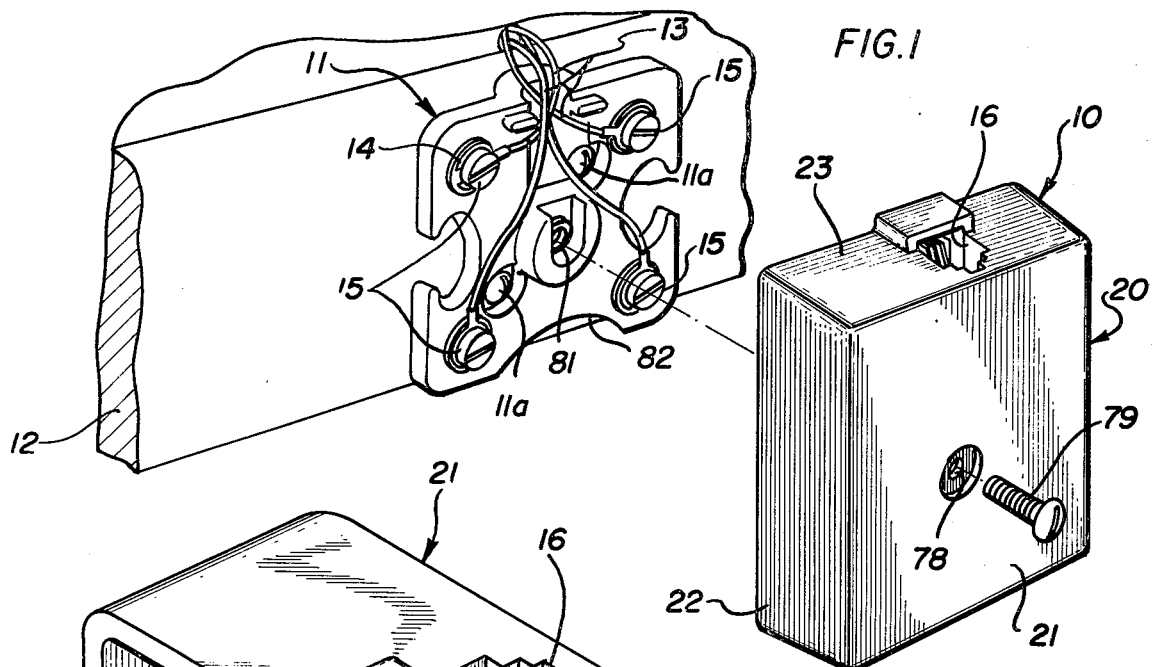
FIG. 1 is an exploded view showing the telephone jack and a terminal block as they appear when they are being assembled for installation.

Turning first to FIG. 1, there is shown a jack 10 embodying the present invention which is especially adapted to mount on a terminal block 11 which is mounted by screws 11a at a suitable location such as a wall baseboard 12 in a telephone user's office or home. A distribution cable comprising multiple distribution wires 13 lead to the terminal block 11 from a remote location such as a junction box, switchboard, or other device. These distribution wires 13 are connected in predetermined orientation, as by spade connectors 14, to screw-type electrical contacts 15. This jack 10 provides a socket 16 into which a suitable telephone instrument cable plug (not shown) can be inserted for rapid but removable telephone connection. The telephone jack 10 thus provides electrical connection between a telephone instrument and cable plug on one hand and the distribution cable wires 13 on the other. In normal preferred installation practice, the terminal block 11 would be mounted to orient socket 16 in the side or bottom position to prevent the accumulation of dirt or other contaminants therein. The showing in FIG. 1 is for clarity of illustration.

In accordance with the invention, the jack 10 is inexpensive to manufacture, and can be quickly and easily installed. To these ends, the jack 10 includes a cover 20, here defined by a top 21 supported by relatively long sides 22 and short sides 23. A clip member 25 mates with this cover 20 and forms a portion of the socket 16. These parts can be formed as described below from any suitable acrylonitrile-butadiene-styrene copolymer, rubber-modified styrene or other resinous dielectric plastic material of low cost which permits easy part fabrication and provides long service life.

Wall membranes 27 of reduced thickness can be formed during cover manufacture to provide auxiliary wire entrance locations to the terminal block 11 for use in difficult installation situations. When the jack 10 is installed in such a location, the installer need only remove, with an appropriate tool, one of these membranes 27 to provide an additional cable access point.

Figure 2:
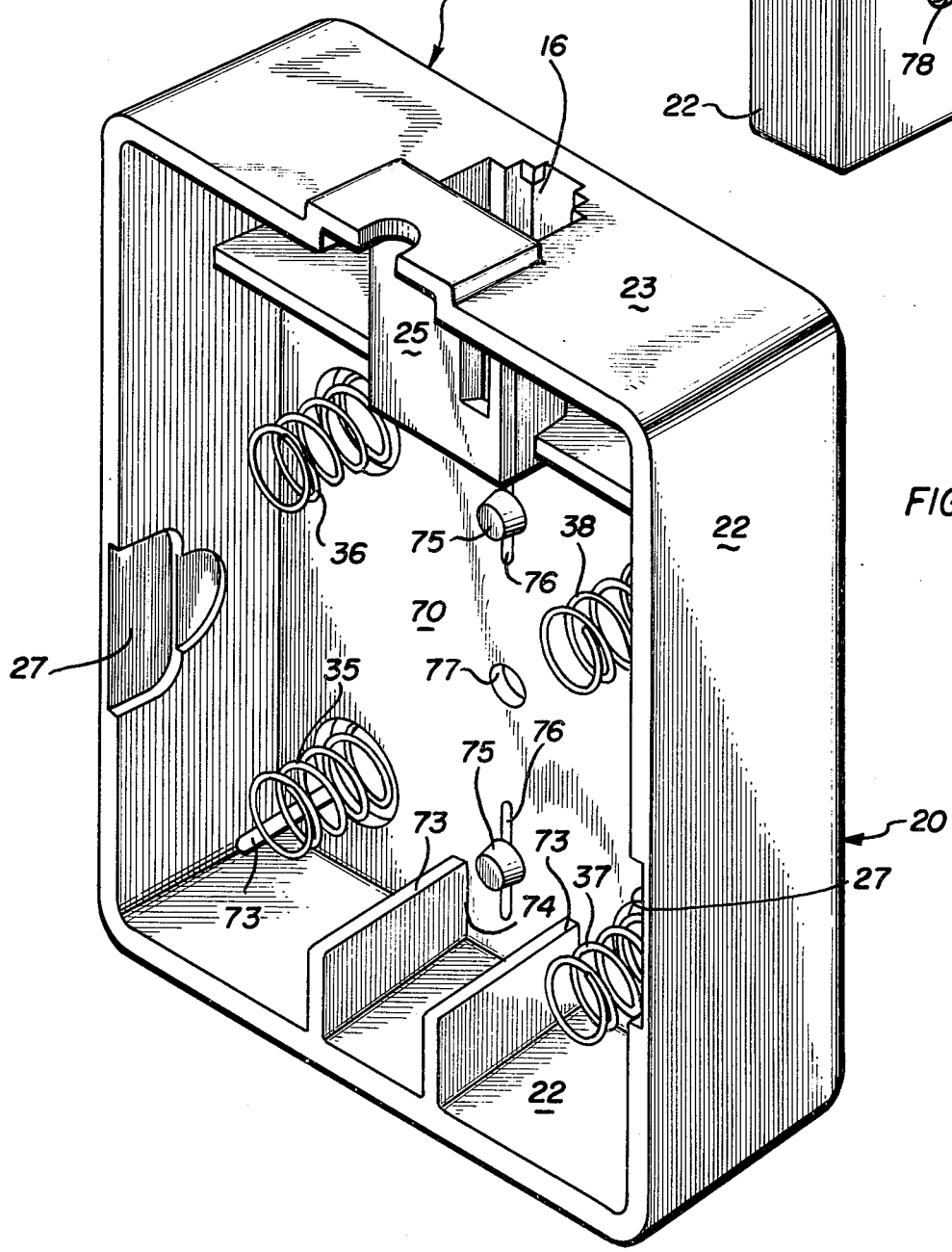
FIG. 2 is a perspective view showing the interior of the telephone jack.

To electrically connect the distribution wires 13 and screw connectors 15 to the instrument cable at the socket 16, a plurality of bi-ended resilient wires 31-34 inclusive are carried within the cover member 20. At one end, these wires 31-34 are formed into spring contacts 35-38, respectively, as shown in FIGS. 2-4. Each spring contact, such as the contact 37 engages at its free ends 40 the head of the corresponding terminal block-carried screw contact 15. In the illustrated embodiment, the spring contacts are helically configured and encircle the head of the screw 15 and make contact therewith as well as contacting the wire connector 14. Other configurations of pressure spring contacts, not illustrated, will be apparent to those skilled in the art. A base 41 of each electrical helical spring contact 35-38 is adapted to fit over a small embossment 42 formed in integral spaced relation in the top 21 of the cover member 20 so as to provide predetermined locational stability to the helical spring electrical contacts 35-38.

Electrical current can be carried by each uninterrup-wire 31-34 across the inner surface of the top 21 from its respective helical contact to an opposite wire end which takes the form of a resilient, folded spring contact 45-48. The intermediate portions of wires 31-34 are positively located and electrically insulated from one another by gripping and/or spacing means generally designated by the numeral 80. These contacts 45-48 are each adapted and mounted at least partly within the socket 16 in fixed but spaced array for electrical contact with the telephone set electrical plug connector. Since the contact wire ends 45-48 are spaced from one another they are electrically insulated from one another to provide the requisite plug connections without inadvertent shorting so that each plug wire separately engages the desired lead from the appropriate telephone instrument wire. Corresponding grooves 49 are provided in the cover membrane 20 itself to further assist in locating and supporting the wire contacts 45-48.

To retain the folded spring electrical contacts in the desired fixed array in close proximity at least partially within the socket in accordance with another aspect of the invention, the clip 25 includes a clip body 50, here comprising a first leg 51 which is adapted to form part of the socket 16, and a second leg 52 extending perpendicularly from the first leg 51. Both body legs 51 and 52 are grooved, as can be envisioned from FIGS. 3 and 4, to locate the lead wires 31-34 in their predetermined fixed array relationship. Carried over the wires atop the first clip body leg 51 is a wire retaining clip cover 55 which is adapted to be secured over the wires and retain them in the associated grooves. To secure the clip 25 within the cover 20, one or more clip body mounting tabs 57 can engage an appropriate recess 58 formed within the cover 20 itself. The second leg 52 terminates in one or more ledges 59 of predetermined thickness, which are used to properly locate additional parts described below, and which ledges 59 are used to retain the clip 25 in assembled relation.

The clip tabs 57 locate the clip 25 in and on the cover 20 with the clip 25 forming a portion of the socket 16. Complementary lands 61 and 62 and grooves 63 and 64 respectively extend transversely of the clip to assist in securing the wires 31-34 lying in the body grooves.

The clip cover 55 is connected to the first clip body leg 51 by hinge 60. In producing the plastic clip, the clip can be molded so as to include the illustrated relatively thin, flexible web member here comprising this hinge 60. As shown in FIG. 6, the hinge 60 is located at one side of the clip 25, and a clip latch device 62 is formed at the other clip side for securing the clip cover 65 over the clip body 50. This latch 62 here takes the form of extended foot 64 and a foot accepting mouth recess 65. During the assembly of the conversion jack unit 10, the wires 31-34 are first laid within the corresponding grooves 80 in the top plus the grooves in the first and second legs 51 and 52 of clip 50, and then the clip cover 55 is folded over the clip body member 51 and the cover foot 64 is inserted into the clip mouth recess 65. The ends of spring contacts 45-48 are located in slots 49 and tabs 57 brought into engagement with recess 58.

In accordance with another aspect of the invention, the wires 31-34 are retained in the predetermined space positions illustrated in FIG. 3 to insure positive electrical contact and long, rugged service life. To assist in retaining these wires, a plate member 70, which was omitted from FIG. 3 for clarity in illustration, lies atop intermediate portions of the wires 31-34 as illustrated in FIGS. 2 and 4.

This plate 70 engages and retains the clip foot 59 which is located between the plate 70 and cover top 21. Embossments, such as a screw receiving embossment 72, can be provided on the cover 20 to maintain the plate in predetermined spaced relation to the top 21. Positioning ribs 73 fit within mating plate grooves 74 to further locate the plate 70 in a predetermined position on and in the cover 20. Fastening studs 75 depending from the cover 20 are adapted be be inserted through stud-accepting slots 76 formed in the cover plate. After assembly, these studs 75 can be worked, if necessary, to provide an expanded head 76 which insures cover plate retention. A plate hole 77 is aligned with a screw or other fastener-accepting hole 78 formed in the cover embossment 72 to permit full insertion of a retaining screw or other fastener 79 through the cover 20, plate 70 to secure the jack device 10 to the terminal block 11.

Thus, with the terminal block 11 being properly wired in a predetermined manner it is possible to readily convert a presently manually connected phone instrument to a modularized plug connected phone by merely located a jack unit 10 of the present invention over a terminal block 11 and inserting screw 79 into fixed nut 81. It should be further noted that ribs 73, located opposite clip 25, serve as orienting means that cooperate with cavity or depression 82 in terminal block 11 to insure proper location of contacts 35-38 relative to the color coded leads 13 that are installed in predetermined relation to terminal block screws 15 in accordance with uniform phone company practice.

The invention is claimed as follows:

1. An electrical jack for a telephone of the like, comprising a cover member, a plurality of bi-ended wires carried in predetermined spaced relation within the cover member, each wire terminating at one end in a spring contact adapted and located for electrical contact with a screw connector carried on a terminal block, each wire terminating at its other end in a resilient reversely folded spring contact adapted and located for electrical contact with a multi-wire male electrical plug connector, a clip member adapted to mate with the cover member and form a female socket therewith to receive the male multi-wire plug, the clip member including a clip body defining a plurality of wire grooves for receiving said wire reversely folded spring contact ends and for mounting the wires in a fixed, electrically spaced apart relationship, the clip member further including a clip cover means adapted to be secured over the grooves to retain the wires in said relationship, and clip hinge means rotatably interconnecting the clip body and the clip cover to permit the clip cover to be folded over the clip body and retain the wires in and on the clip.

2. An electrical jack according to claim 1 including complementary land and groove means formed on said clip member body and said clip member cover and extending transversely of said wire grooves for securing said wires in said wire grooves.

3. An electrical jack according to claim 1 wherein said clip body includes a first leg adapted to form part of said socket, and a second leg extending away from said first leg at an angle for leading said wires toward said socket in said fixed, electrically spaced apart relationship.

4. An electrical jack according to claim 5 wherein said second leg terminates in a ledge, the leg being adapted to engage the cover member and having a predetermined thickness to be retained by a plate member at a predetermined stand-off distance from the cover member to permit passage of said wires between said cover member and said cover plate member.

5. An electrical jack according to claim 1 wherein said clip hinge means is provided at one side of said clip body, and wherein said clip member includes clip latch means at an opposite side of said clip body for latching said clip cover over said clip body.

6. An electrical jack according to claim 5 wherein said latch includes an extended foot on one side of said clip cover and said body means, and a retaining mouth recess on the other of said clip cover means and said clip body means, and wherein said hinge means permits said foot to be inserted into said mouth recess to latch said clip cover means over said clip body.

7. An electrical jack according to claim 1 wherein said cover includes cover grooves adapted to receive each folded spring contact and tip in said fixed, electrically spaced apart relationship in said socket.

8. An electrical jack according to claim 1 including a cover plate member adapted for mounting inside said cover member at a position spaced apart from a cover member top to assist in securing said wires in said jack.

9. An electrical jack according to claim 8 including lands formed in one of said cover member and cover plate member, and mating grooves formed in the other of said cover member and cover plate member to locate said plate and said wires in a predetermined position on and in said cover member.

10. An electrical jack according to claim 8 including first fastener means for securing said cover plate to said cover member.

11. An electrical jack according to claim 8 including second fastener means for securing said cover member and the wires carried therein to a terminal block.

12. An electrical jack according to claim 11 wherein said second fastener means comprises a threaded screw fastener.

13. An electrical jack for a telephone or the like, comprising a cover member, a clip member adapted to mate with the cover member and form a female socket therewith to receive a male multi-wire plug, means in at least said clip member for mounting a plurality of uninterrupted jack wires in and on the cover and clip members and for positioning the jack wires to engage the plug wires in electrically connective contacts, and means for mounting a multi-wire terminal block in and on the cover member with terminal block electrical contacts in electrically connective contact with said plurality of jack wires, the clip member including a clip body defining a plurality of grooves for receiving the jack wires, a clip cover adapted to be secured over the wires, and clip hinge means rotatably interconnecting the clip body and the clip cover to permit the clip cover to be folded over the clip body and retain the wires in and on the clip.

14. An electrical jack according to claim 13 including a plurality of bi-ended jack wires carried within said cover member, each wire terminating at one end in a helical spring contact adapted and located for electrical contact with a screw connector carried on a terminal block.

15. An electrical jack according to claim 13 wherein said clip includes mounting means for mounting said clip in and on said cover member with said clip forming part of said socket.

16. An electrical jack for the telephone or the like according to claim 13 wherein said clip member includes a body having a first leg adapted to form part of said socket, and a second leg extending away from the first leg at an angle for leading jack wires toward said socket in a fixed, electrically spaced apart relationship.

17. An electrical jack according to claim 13 including a cover plate adapted for mounting inside said cover member at a position spaced apart from a cover top to assist in securing the wires in and on the jack.

18. An electrical jack according to claim 17 including fastener means for securing said cover plate to said cover.

19. An electrical jack according to claim 17 wherein said clip member includes an extended ledge means having a predetermined thickness to be retained by and to locate said cover plate at a predetermined standoff distance from a cover top portion to permit passage of the wires between said cover plate and the cover top.

* * * * *